(12) United States Patent
Shi et al.

(10) Patent No.: US 11,010,554 B2
(45) Date of Patent: May 18, 2021

(54) METHOD AND DEVICE FOR IDENTIFYING SPECIFIC TEXT INFORMATION

(71) Applicant: BEIJING GRIDSUM TECHNOLOGY CO., LTD., Beijing (CN)

(72) Inventors: Peng Shi, Beijing (CN); Ke Jiang, Beijing (CN)

(73) Assignee: Beijing Gridsum Technology Co., Ltd., Beijing (CN)

(*) Notice: Subject to any disclaimer, the term of this patent is extended or adjusted under 35 U.S.C. 154(b) by 84 days.

(21) Appl. No.: 16/347,860

(22) PCT Filed: Nov. 8, 2017

(86) PCT No.: PCT/CN2017/109841
§ 371 (c)(1),
(2) Date: May 7, 2019

(87) PCT Pub. No.: WO2018/086519
PCT Pub. Date: May 17, 2018

(65) Prior Publication Data
US 2019/0272319 A1    Sep. 5, 2019

(30) Foreign Application Priority Data
Nov. 8, 2016  (CN) .......................... 201610983648.4

(51) Int. Cl.
*G06F 40/284* (2020.01)
*G06F 40/20* (2020.01)
*G06F 40/211* (2020.01)

(52) U.S. Cl.
CPC ............ *G06F 40/284* (2020.01); *G06F 40/20* (2020.01); *G06F 40/211* (2020.01)

(58) Field of Classification Search
None
See application file for complete search history.

(56) References Cited

U.S. PATENT DOCUMENTS

2003/0208354 A1   11/2003   Lin et al.

FOREIGN PATENT DOCUMENTS

| CN | 1922610 A | 2/2007 |
|---|---|---|
| CN | 1924995 A | 3/2007 |
| CN | 101075228 A | 11/2007 |
| CN | 101488927 A | 7/2009 |
| CN | 102314417 A | 1/2012 |

(Continued)

*Primary Examiner* — Quynh H Nguyen
(74) *Attorney, Agent, or Firm* — Gang Yu

(57) ABSTRACT

The invention discloses a method and a device for identifying specific text information, relates to the technical field of computers, and is mainly intended to enable quick, easy and effective identification of text information with a specific format in a target text. The main technical solution of the present invention is to perform multi-dimensional vectorization to the target text according to a preset dimension to obtain a vectorized text; acquire text information compliant with a preset state transition rule in the vectorized text; calculate the text information by using a dynamic programming algorithm, and determine optimal text information compliant with a preset format, and output the optimal text information as the result of identifying the specific text information in the target text. The invention is mainly used for identifying and acquiring text information.

10 Claims, 2 Drawing Sheets

(56) References Cited

FOREIGN PATENT DOCUMENTS

| CN | 102360383 A | 2/2012 |
|----|-------------|--------|
| CN | 103164426 A | 6/2013 |
| CN | 103294664 A | 9/2013 |
| CN | 103425691 A | 12/2013 |
| CN | 104331438 A | 2/2015 |
| CN | 104866478 A | 8/2015 |
| CN | 106021227 A | 10/2016 |

METHOD AND DEVICE FOR IDENTIFYING SPECIFIC TEXT INFORMATION

TECHNICAL FIELD

The present invention relates to the technical field of computers, and in particular, to a method and a device for identifying specific text information.

BACKGROUND ART

Natural Language Processing, as one of the early research fields of artificial intelligence and also an extremely important field, mainly includes human-computer dialogue and machine translation. It is a science integrating linguistics, computer science and mathematics. Natural Language Processing (NLP) is a technique for processing natural language information. From a linguistic point of view, the NLP is also called Computational Linguistics. Natural Language Processing includes Natural Language Understanding (NLU) and Natural Language Generation (NLG). Natural Language Understanding refers to a deep understanding to the content and intention of natural language. In the field of artificial intelligence, the Natural Language Understanding refers to a deep understanding by a computer to the content and intention of natural language. Natural Language Generation refers to the processing from an unnatural language input to a natural language output. The Natural Language Understanding and the Natural Language Generation are reversed with each other.

In the identification of natural language, the accuracy of identifying many named entities, such as an address, an organization, etc., often affects the accuracy of the entire analysis. In particular, the complexity and ambiguity of Chinese make it more complex to identify a Chinese named entity than an English one. For traditional identification methods, such as those that make reference to HMM (Hidden Mardov Model), Maximum Entropy Model, Conditional Random Field and the like model to identify the named entities, because the use of these models requires high quality training samples and also results in complex training and slow retrospection, it takes much preparation and time to get the desired results. For some simple identification methods, such as regularization, state machine, and the like, the provided constraints are too harsh, which makes it difficult to achieve the desired effect of identification.

SUMMARY OF THE INVENTION

In view of this, the invention provides a method and a device for identifying specific text information, and mainly intends to enable quick, easy, and effective identification of text information with a specific format in a target text.

To this end, the invention mainly provides the following technical solution:

In an aspect, the present invention provides a method for identifying specific text information, the method comprising:

performing multi-dimensional vectorization to a target text according to a preset dimension to obtain a vectorized text;

acquiring text information compliant with a preset state transition rule in the vectorized text; and calculating the text information by using a dynamic programming algorithm, and determining optimal text information compliant with a preset format, and outputting the optimal text information as the result of identifying the specific text information in the target text.

In another aspect, the present invention provides a device for identifying specific text information, the device comprising:

a vectorization unit, configured to perform multi-dimensional vectorization to a target text according to a preset dimension to obtain a vectorized text;

an acquisition unit, configured to acquire text information compliant with a preset state transition rule in the vectorized text obtained by the vectorization unit; and a calculation unit, configured to calculate the text information acquired by the acquisition unit by using a dynamic programming algorithm, and determine optimal text information compliant with a preset format, and output the optimal text information as the result of identifying the specific text information in the target text.

The method and device for identifying specific text information according to the present invention are mainly used for identifying text information with a specific format in the target text, and the specific formats can be defined and represented by the transition of different states. It determines the dimension of state change by performing multi-dimensional vectorization to the target text, and according to the state change of the characters in the vectorized text, calculates and obtains the text information compliant with the specific format by using the preset state transition rule and the dynamic programming algorithm, and then outputs and displays the text information as the result of such identification. Compared with the existing identification methods, the present identification method combines the state transition with the dynamic programming calculation, and simply needs to set the state transition rule and the vector dimension participating in the calculation before performing the calculation to obtain the corresponding result of such identification, without having to acquire relevant model training samples for repeated training and learning. As such, in practical applications, it enables to quickly identify the target text by simple setting, to obtain specific text information with a specific format in the target text.

BRIEF DESCRIPTION OF THE DRAWINGS

Various other advantages and benefits will become apparent to those skilled in the art from the detailed description of the preferred embodiments below. The figures are only used for illustrating the preferred embodiments and are not to be construed as limiting. Throughout the figures, the same reference character is used to refer to the same part. In the figures.

DETAILED DESCRIPTION OF THE INVENTION

Exemplary embodiments of the present invention will be described in more detail below with reference to the accompanying figures. While the exemplary embodiments of the present invention are shown in the accompanying figures, it is understood that and the present invention may be implemented by various ways without being limited by the embodiments herein. Instead, these embodiments are provided to enable more fully understanding of this invention and the fully communication of the scope of the invention to those skilled in the art.

Figure 1:
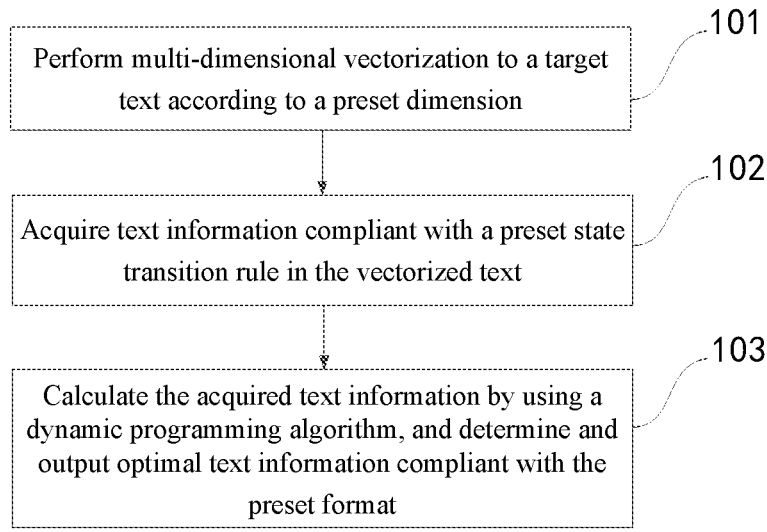
FIG. 1 is a flowchart of a method for identifying specific text information according to an embodiment of the present invention.

An embodiment of the present invention provides a method for identifying specific text information. As shown in FIG. 1, the method is applied to identify text information with a specific format in a target text, wherein the specific format may be defined and represented by the transition of different states. The method includes the following specific steps:

101. Performing Multi-Dimensional Vectorization to the Target Text According to a Preset Dimension.

To identify the target text, it is required to firstly perform vectorization to the target text, where the vectorization of text is also a common step in general text processing. The vectorization to the target text in the embodiment herein comprises performing word segmentation to the target text, representing the target text by using the result of the word segmentation as a dimension, and performing vectorized representation to the target text in another dimension, such that the target text has a plurality of vectorized representation results in multiple dimensions. For example, it may further break down the target text into a vectorized representation of the word based on the result of the word segmentation, in order to represent the target text by the dimension of the word, or perform the vectorized representation to the target text according to the word class of the segmented word.

In the embodiment of the present invention, the multi-dimensional vectorized representation of the target text requires presetting a number of dimensions to be vectorized, where the higher the number of dimensions is, the more complex it is to process the corresponding target text, and the result of the vectorized representation is more distinguishable relative to other texts. In order to balance the relation of the complexity with the distinguishability in text processing, the determination of the number of dimensions is set to an optional mode, which means before the text processing, the number of dimensions of the text vectorization can be selectively set according to the specific condition of the target text.

102. Acquiring Text Information Compliant with a Preset State Transition Rule in the Vectorized Text.

The preset state transition rule is a determination rule established according to the specific text information to be identified. The preset state in the embodiment herein is determined by the format of the specific text information. For example, if the specific text information is an address, the preset state may be such states as a place name, a province, a city, a district, a county, a street, etc., while if the specific text information is time information, the states include: a figure, a year, a month, a day, or an o'clock, a minute, a second, etc., where the figure also includes a Chinese character or a digit. For the set state, it is also necessary to determine the transition rule between different states to identify whether there is specific text information in the target text. For example, if the time format to be identified includes time information in the three states: "o'clock", "minute" and "second", then the set state transition rule is: a "figure" to a "figure"; a "figure" to an "o'clock", "minute", "second"; an "o'clock" to a "figure"; an "minute" to a "figure"; and it starts with the state "figure", and ends with the state "o'clock" or "second". According to the above state transition rule, the time information matched in the target text may be the "1 o'clock 2 minute 3 second", or "12 o'clock 1 minute 50 second". In addition, it may also be the "16 o'clock 3 minute 40 second", and the like.

With respect to the preset state transition rule, in the embodiment herein, it is allowed to set a separate state transition rule, or set different transition rules for different states, or set different transition rules for a same state. For example, for the above-mentioned time state transition rule, it may also remove the "o'clock" state and then set another state transition rule, such that the identification may also generate such results as "3 minute 40 second", or "13 minute 5 second", and the like. If an address state transition rule is added to the above-mentioned time state transition rule, the corresponding address result may appear in the result of identification, such as the identification result of "No. 1 Zhongguancun Avenue, Haidian District, Beijing".

It is noted that the state set in the embodiment of the present invention may correspond to vector values in different dimensions, which means the vector values in different dimensions in the target text represented according to the multi-dimensional vectorization of 101 are of a correspondence relationship with the set states, while the correspondence relationship herein is not a one-to-one correspondence relationship. For example, in the vector dimension of the word class, the state "figure" corresponds to a numeral word, while the states "o'clock", "minute", "second" respectively correspond to a temporal noun. In the vector dimension of the word, the state "figure" corresponds to a Arabic numeral or a Chinese number, while the states "o'clock", "minute", and "second" respectively correspond to the three words: "o'clock", "minute", and "second". It can be seen that with respect to different dimensions, the accuracy of distinguishing in deciding the state transition is also different. For the dimensions with highly distinguishable states, the accuracy of such decision is relatively high.

103. Calculating the Acquired Text Information by using a Dynamic Programming Algorithm, and Determining and Outputting Optimal Text Information Compliant with the Preset Format.

With respect to the text information acquired in 102, when the set state transition rule is relatively broad, multiple identification results may be obtained for the same text information with the specific format in the target text. For example, for the time information "12 o'clock 1 minute 50 second", the final results may include "12 o'clock 1 minute 50 second", and "2 o'clock 1 minute 50 second", where the latter result is a wrong identification result. To avoid any unnecessary or wrong result, it is necessary to perform further calculation to the acquired text information. In the embodiment herein, the dynamic programming algorithm is used to calculate the optimal result with the preset format compliant with the specific text information. That is, the dynamic programming algorithm calculates the text information that best matches the state transition rule or has the longest length. The embodiments of the present invention are not limited to the specific state programming algorithm, because there are numerous methods of the dynamic programming algorithm that can also implement the calculation of the optimal result.

It is noted that the dynamic programming calculation in this step is to calculate the optimal text information for the same text information with the specific format in the target text, which means the dynamic programming algorithm is separately used to calculate the optimal text information for different text information in the target text. In view of the result of the identification, the final output identification result is a plurality of pieces optimal text information compliant with the state transition rule at different positions in the target text.

It can be seen from the above implementations that the method and device for identifying specific text information according to the embodiments of the present invention are mainly used for identifying text information with a specific format in the target text, and the specific formats can be defined and represented by the transition of different states. It determines the dimension of state change by performing multi-dimensional vectorization to the target text, and according to the state change of the characters in the vectorized text, calculates and obtains the text information compliant with the specific format by using the preset state transition rule and the dynamic programming algorithm, and then outputs and displays the text information as the result of such identification. Compared with the existing identification methods, the identification method according to the embodiments of the present invention combines the state transition with the dynamic programming calculation, and simply needs to set the state transition rule and the vector dimension participating in the calculation before performing the calculation to obtain the corresponding result of such identification, without having to acquire relevant model training samples for repeated training and learning. As such, in practical applications, it enables to quickly identify the target text by simple setting, to obtain specific text information with a specific format in the target text.

Figure 2:
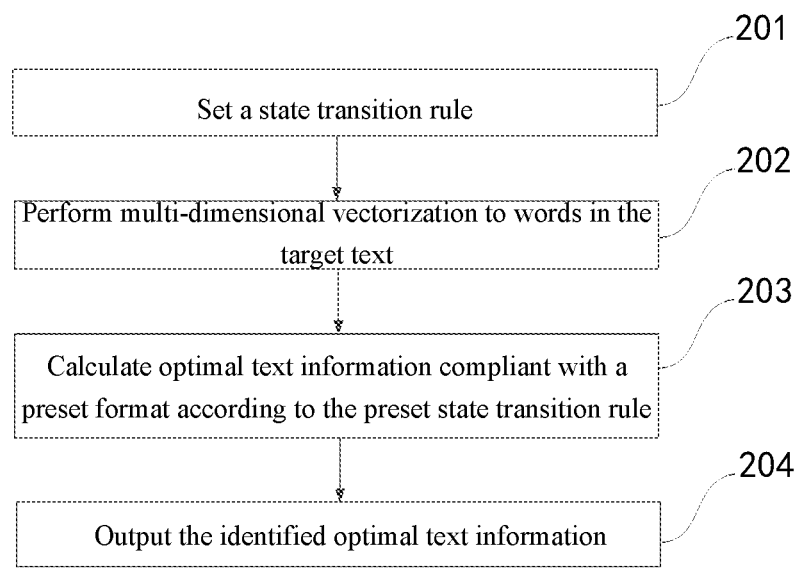
FIG. 2 is a flowchart of another method for identifying specific text information according to an embodiment of the present invention.

In order to explain in more detail the method for identifying specific text information according to the present invention, the embodiments of the present invention are described in combination with examples to explain the method for identifying specific text information. As shown in FIG. 2, in the process of identification of specific text information, the matching of state transition and the dynamic programming calculation are performed simultaneously, that is, the optimal combination of text information is calculated and output simultaneously in the process of matching of state transition, through the following specific steps:

201. Setting a State Transition Rule.

The embodiment of the present invention exemplifies a short sentence representing a target text.

The short sentence is "China was born on the morning of Oct. 1, 1949", and the specific text information to be identified is date information, that is, "Oct. 1, 1949". Before performing the identification operation, it is required to first determine the state transition rule of the date. For the date information to be identified in this example, it is required to define 4 states, namely "figure", "year", "month", and "day". The state transition relationship compliant with the format of the date information is: the figure transitioned to a year or a month or a day or a figure; a year transitioned to a figure; a month transitioned to a figure.

While determining the state transition rule, it is also necessary to determine a start state and an end state of the date information, thereby determining the start point and the end point of the text information with the specific format. In this example, the start state is a "figure", while the end state is a "day".

202. Performing Multi-Dimensional Vectorization to Words in the Target Text.

The multi-dimensional vectorization to each word in the short sentence is mainly vectorized by three dimensions: word, word class and the result of word segmentation, where the result of word segmentation is the word obtained by segmenting the short sentence. The specific manner used in the word segmentation process is not specifically limited in the embodiment of the present invention. The determination of word class is a vectorization process based on a check list of preset word classes. The specific vectorization results are detailed in the following table:

TABLE 1

| Table of Short Sentence Vectorization Based on Three dimensions | | | | | | | | | | | | | | | | | |
|---|---|---|---|---|---|---|---|---|---|---|---|---|---|---|---|---|---|
| 中 | 国 | 诞 | 生 | 于 | 1 | 9 | 4 | 9 | 年 | 1 | 0 | 月 | 1 | 日 | 的 | 上 | 午 |
| ns | ns | v | v | p | nt | nt | nt | nt | nt | nt | nt | nt | nt | nt | u | nt | nt |
| China | China | was born | was born | on | 1949 | 1949 | 1949 | 1949 | 1949 | October | October | October | 1 | 1 | 的 | morning | morning |

Wherein, the first row is a vectorized representation in the dimension of word; and the second row is a vectorized representation in the dimension of word class, and the third row is a vectorized representation in the dimension of the result of word segmentation.

The vectorized representation of the word class in the above table is based on the following check list of word classes:

TABLE 2

| Check List of Word Classes | | | | | |
|---|---|---|---|---|---|
| Class | Type | Example | Class | Type | Example |
| a | Adjective | Beautiful | ni | organization name | insurance company |
| v | Verb | run, learn | nl | location noun | suburb |
| c | Conjunction | and, although | ns | geographical name | Beijing |
| d | Adverb | very | nt | temporal noun | today, Ming dynasty |
| e | Exclamation | ah | nz | other proper noun | Nobel Prize |
| u | Auxiliary | of | p | Preposition | on, in |

Wherein, the table shows an extract of part of the check list of word classes, and each word class also corresponds to a large amount of words or phrases.

203. Calculating Optimal Text Information Compliant with a Preset Format According to the Preset State Transition Rule.

After performing the multi-dimensional vectorization representation to the target text, the text information that best matches the preset format is calculated according to the state transition rule set in 201 and in combination with the dynamic programming algorithm. The specific identification matching process includes:

firstly, determining a first character with the initial state according to the arrangement of characters in the vectorized text. Since the initial state is defined as the "figure", for the short sentence, after judging each word in the short sentence one by one, when proceeding to the word "1", it is determined as compliant with the state "figure", and is set as the starting point of the text information.

It then determines whether the state change relationship between the word "1" and its adjacent word "9" conforms to the set state transition relationship. If so, it then proceeds to the subsequent words one by one; and if not, it determines whether the current word, i.e., the word "9" is the character with the initial state, and continues to match the state transition rule based on this.

Thirdly, after determining that there are more than two consecutive characters compliant with the state transition rule, it is necessary to determine whether the current state of the current word is the end state after determining that such current word conforms to the state transition rule, which means to determine whether the state of the word is "day". If not, it proceeds to the following words, and if yes, it determines that the current word is the last character, and the text information extracted from the first character to the last character is used as candidate text information compliant with the state transition rules. For the above short sentence, the time information extracted is: "Oct. 1, 1949", "October 1, 949", "October 1, 49", "October 1, 9", and "1". For the above time information, it is clear that the first one "Oct. 1, 1949" is the desired optimal text information.

To filter out the above incorrect time information, it is necessary to calculate the most reasonable time information through the dynamic programming algorithm. In an embodiment of the invention, Viterbi algorithm is used to determine the optimal time information. The algorithm is mainly used to calculate the probability of state transition between two adjacent words. The algorithm is currently mainly applied in the hidden Markov model, where certain conditions need to be met in the specific calculation, which means the state of the current moment is determined only by the state of the previous moment. In the embodiment of the present invention, since the state of the previous word corresponds to a plurality of different dimensions, when calculating, the state probability value of the current word is the sum of the probability values of the previous word in different dimensions. Further, since the vectorized representations of different dimensions are distinguishable to different extent with respect to state transitions, different weights may be set for different dimensions to calculate a weighted probability value of the state of the current word. It is noted that before the calculation, it is necessary to set a number of dimensions to participate in the calculation and a weight value of each dimension, where the number of dimensions depends on the number of dimensions for vectorization of the target text, that is, the number of dimensions determined in the dynamic programming calculation is less than or equal to the number of dimensions for the vectorization.

After obtaining the weighted probability value of different dimensions by calculating a single word in the target text through using the Viterbi algorithm, the probability value is defined as an overall probability value compliant with the preset format between adjacent characters in different dimensions. The overall probability value is then compared to a preset threshold, and if it exceeds such threshold, the word adjacent to the above word is determined to as part of the optimal text information. If it is less than the threshold, the two words can be segmented. Wherein, the threshold is an empirical value which can be adjusted by manual setting.

In the embodiment of the present invention, the calculation by means of the Viterbi algorithm or other dynamic programming algorithms is intended to obtain optimal text information that best matches the format of the specific text information. In the above short sentence, it mainly used to select the longest text information, i.e., "Oct. 1, 1949".

In addition, for the wrong result "1", it can be filtered out by setting the state transition rule. For example, in the state transition rule, it may add another rule that the states "year", "month", and "day" should all appear in the identified time information, to avoid the wrong result "1". That is to say, the corresponding text information may be acquired by setting the state transition format of the characters in the text information and determining whether the format conforms to the state transition format of the specific text information.

204. Outputting the Identified Optimal Text Information.

After the dynamic programming calculation, the final output identification result is "Oct. 1, 1949", and if there are multiple pieces of date information in the target text, an optimal identification result is output for different date information. As such, the accuracy in identifying the target text content is improved.

Figure 3:
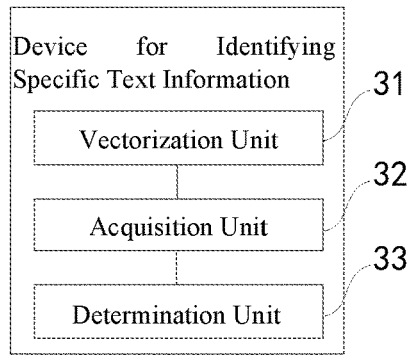
FIG. 3 is a block diagram showing the composition of a device for identifying specific text information according to an embodiment of the present invention.

In further, as an implementation of the above method, an embodiment of the present invention provides a device for identifying specific text information. The embodiment of the device corresponds to the embodiment of the above method. To facilitate reading, the details of the embodiment of the above method are not further described in detail separately in the embodiment of the device. However, it is understood that the device in this embodiment can implement all the details in the embodiment of the above method. The device is used in an apparatus for analyzing or acquiring text information, as shown in FIG. 3, the device comprising:

a vectorization unit 31, configured to perform multi-dimensional vectorization to a target text according to a preset dimension to obtain a vectorized text;

an acquisition unit 32, configured to acquire text information compliant with the preset state transition rule in the vectorized text obtained by the vectorization unit 31;

a calculation unit 33, configured to calculate the text information acquired by the acquisition unit 32 by using a dynamic programming algorithm, and determine optimal text information compliant with a preset format, and output the optimal text information as the result of identifying the specific text information in the target text.

Figure 4:
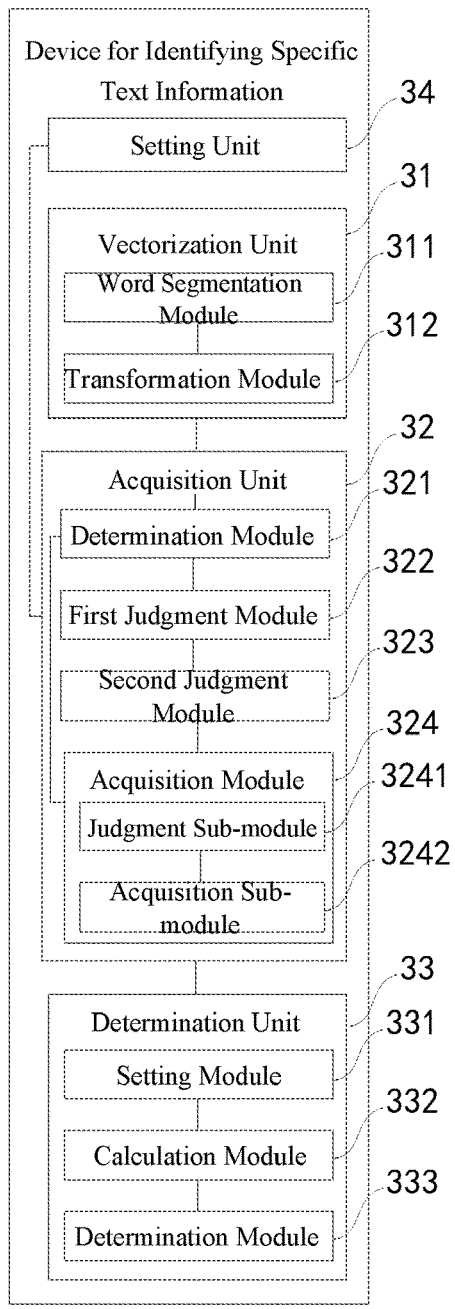
FIG. 4 is a block diagram showing the composition of another device for identifying specific text information according to an embodiment of the present invention.

In further, as shown in FIG. 4, the determination unit 33 comprises:

a setting module 331, configured to set a number of dimensions in the dynamic programming algorithm for calculating characters, and a weight value of an individual dimension;

a calculation module 332, configured to use Viterbi algorithm to calculate an overall probability value that the format between adjacent characters is compliant with the preset format in different dimensions set by the setting module 331; and a determination module 333, configured to determine the text information with the overall probability value as calculated by the calculation module 332 greater than a preset threshold as the optimal text information.

In further, as shown in FIG. 4, the device further comprises:

a setting unit 34, configured to set a state transition relationship for characters according to the preset format before the acquiring unit 32 acquires the text information compliant with the preset state transition rule in the vectorized text; and the setting unit 34 is further configured to set an initial state and an end state of the preset format.

In further, as shown in FIG. 4, the acquisition unit 32 comprises:

a determination module 321, configured to determine a first character with the initial state according to the arrangement of characters in the vectorized text;

a first judgment module 322, configured to determine whether the state transition between the first character determined by the determination module 321 and the subsequent adjacent character conforms to the set transition relationship;

a second judgment module 323, configured to determine whether the character compliant with the transition relationship determined by the first judgment module 322 has the end state, and if so, determining that the character is a last character; and an acquisition module 324, configured to acquire the text information between the first character determined by the judgment module 321 and the last character determined by the second judgment module 323 as the text information compliant with the preset state transition rule.

In further, as shown in FIG. 4, the acquisition module 324 comprises:

a judgment sub-module 3241, configured to determine whether the state transition format of the characters in the text information conforms to the state transition format of the specific text information; and an acquisition sub-module 3242, configured to acquire the text information as the text information compliant with the preset state transition rule when the judgment sub-module 3241 determines it as compliant.

In further, as shown in FIG. 4, the vectorization unit 31 comprises:

a word segmentation module 311, configured to perform word segmentation to the target text;

a transformation module 312, configured to select a word, a word class and the result of the word segmentation from the word segmentation module 311 as a dimension, and transforming the target text into a three-dimensional vector.

It can be seen from the above that the method and device for identifying specific text information according to the embodiments of the present invention are mainly used for identifying text information with a specific format in the target text, and the specific formats can be defined and represented by the transition of different states. It determines the dimension of state change by performing multi-dimensional vectorization to the target text, and according to the state change of the characters in the vectorized text, calculates and obtains the text information compliant with the specific format by using the preset state transition rule and the dynamic programming algorithm, and then outputs and displays the text information as the result of such identification. Compared with the existing identification methods, the identification method according to the embodiments of the present invention combines the state transition with the dynamic programming calculation, and simply needs to set the state transition rule and the vector dimension participating in the calculation before performing the calculation to obtain the corresponding result of such identification, without having to acquire relevant model training samples for repeated training and learning. As such, in practical applications, it enables to quickly identify the target text by simple setting, to obtain specific text information with a specific format in the target text. For the setting of the state transition rule, the fuzzy matching of the desired text information may also be achieved by setting the level of detail. In addition, adding the dynamic programming into the calculation of dimensions and assigning the corresponding weight values enable more accurate control to the specific text information content, thereby improving the accuracy in identifying the specific text information.

The device for identifying the specific text information comprises a processor and a storage, wherein the vectorization unit, the acquisition unit, the determination unit and the like above are stored as a program unit in the storage, and wherein the corresponding functions are implemented by executing the above program unit stored in the storage by the processor.

The processor contains a core, which calls the corresponding program unit from the storage. One or more cores may be provided, and the text information with the specific format in the target text may be identified quickly and easily by adjusting the parameters of the core.

The storage may include volatile memory, random access memory (RAM), and/or non-volatile memory in a computer readable medium, such as read only memory (ROM) or flash memory (flash RAM), the memory including at least one Memory chip.

The present application also provides a computer program product, that when executed on a data processing device, is adapted to perform initialization for program code with the following method steps: performing multi-dimensional vectorization to a target text according to a preset dimension to obtain a vectorized text; Acquiring text information compliant with a preset state transition rule in the vectorized text; Calculating the text information by using a dynamic programming algorithm, and determining optimal text information compliant with a preset format, and outputting the optimal text information as the result of identifying the specific text information in the target text.

It is appreciated to those skilled in the art that the embodiments of the present application can be provided as a method, a system, or a computer program product. As such, the present application may be embodied in the form of an entirely hardware embodiment, an entirely software embodiment, or a software and hardware combined embodiment. In addition, the application may take the form of a computer program product embodied on one or more computer-usable storage media with computer-usable program code contained therein (including but not limited to disk storage, CD-ROM, optical storage, etc.).

The present application is described with reference to flowcharts and/or block diagrams of the method, the device (system), and the computer program product according to the embodiments of the present application. It should be understood that each process and/or block in the flowchart and/or block diagram, and a combination of a process and/or a block in the flowchart and/or the block diagram may be implemented by a computer program instruction. These computer program instructions can be provided to a processor of a general purpose computer, a special purpose computer, an embedded processor, or other programmable data processing device to produce a machine, such that the instructions executed by the processor of the computer or other programmable data processing device produce a device for implementing the functions specified in one or more of processes of the flowchart and/or in one or more blocks of the block diagram.

The computer program instructions can also be stored in a computer readable storage capable of instructing a computer or other programmable data processing device to operate in a particular manner, such that the instructions stored in the computer readable storage produce an article of manufacture comprising an instruction device that implements the functions specified in one or more processes of the flowchart and/or one or more blocks of the block diagram.

These computer program instructions can also be loaded onto a computer or other programmable data processing device to perform a series of operation steps on the computer or other programmable device to produce the computer-implemented processing, such that the instructions executed on the computer or other programmable device provide steps for implementing the functions specified in one or more processes of the flowchart and/or one or more blocks of the block diagram.

In a typical configuration, a computing device includes one or more processors (CPU), input/output interfaces, network interfaces, and memory.

The storage may include volatile memory, random access memory (RAM), and/or non-volatile memory in a computer readable medium, such as read only memory (ROM) or flash memory (flash RAM). The storage is an example of a computer readable medium.

The computer readable medium includes a non-volatile and volatile, removable and non-removable medium that may implement information storage by means of any method or technology. The information may be a computer readable instruction, a data structure, a program module, or other data. Examples of the computer storage medium include, but are not limited to, phase change memory (PRAM), static random access memory (SRAM), dynamic random access memory (DRAM), other types of random access memory (RAM), read only memory. (ROM), electrically erasable programmable read only memory (EE-PROM), flash memory or other memory technology, compact disk read only memory (CD-ROM), digital versatile disk (DVD) or other optical storage, magnetic cassette tape, magnetic tape storage or other magnetic storage device or any other non-transmission media, that may be used to store information that can be accessed by a computing device. As defined herein, the computer readable medium does not include a transitory computer readable medium, such as a modulated data signal and carrier wave. It is also to be understood that the terms "comprises", "comprising" or any other variations thereof are intended to cover a non-exclusive inclusion, such that a process, a method, an article or an apparatus including a series of elements not only includes such elements, but also include other elements not explicitly listed, or elements that are inherent to such a process, method, article, or device. An element defined by the phrase "comprising a . . . " does not exclude the presence of an additional identical element in the process, method, article, or device that comprises such element, without further limitation.

It is appreciated to those skilled in the art that the embodiments of the present application can be provided as a method, a system, or a computer program product. As such, the present application may be embodied in the form of an entirely hardware embodiment, an entirely software embodiment, or a software and hardware combined embodiment. In addition, the application may take the form of a computer program product embodied on one or more computer-usable storage media with computer-usable program code contained therein (including but not limited to disk storage, CD-ROM, optical storage, etc.).

The above are merely embodiments of the present application and are not intended to limit the application. Various changes and modifications can be made to the present application by those skilled in the art. Any modification, equivalent, improvement, etc. made within the spirit and scope of the present application is intended to be included within the scope of the appended claims herein.

We claim:

1. A method for identifying specific text information, characterized in that, the method comprises:
    performing multi-dimensional vectorization to a target text according to a preset dimension to obtain a vectorized text;
    acquiring text information compliant with a preset state transition rule in the vectorized text, wherein the preset state transition rule is a determination rule established according to specific text information to be identified in the target text, a preset state is determined by a format of the specific text information, and the specific text information is address information or time information; and
    calculating the text information by using a dynamic programming algorithm, and determining optimal text information compliant with a preset format, and outputting the optimal text information as the result of identifying the specific text information.

2. The method according to claim 1, characterized in that, the calculating the text information by using a dynamic programming algorithm, and determining optimal text information compliant with a preset format comprises:
    setting a number of dimensions in the dynamic programming algorithm for calculating characters, and a weight value of an individual dimension;
    using a Viterbi algorithm to calculate an overall probability value that the format between adjacent characters is compliant with the preset format in different dimensions; and
    determining the text information with the overall probability value greater than a preset threshold as the optimal text information.

3. The method according to claim 1, characterized in that, before the acquiring text information compliant with a preset state transition rule in the vectorized text, the method further comprises:
    setting a state transition relationship of characters according to the preset format; and
    setting an initial state and an end state of the preset format.

4. The method according to claim 3, characterized in that, the acquiring text information compliant with a preset state transition rule in the vectorized text comprises:
    determining a first character with the initial state according to the arrangement of characters in the vectorized text;
    determining whether the state transition between the first character and the subsequent adjacent character conforms to the set transition relationship;
    determining whether the character compliant with the transition relationship has the end state, and if so, determining that the character is a last character; and
    acquiring the text information between the first character and the last character as the text information compliant with the preset state transition rule.

5. The method according to claim 4, characterized in that, the acquiring the text information between the first character and the last character as the text information compliant with the preset state transition rule comprises:
    determining whether the state transition format of the characters in the text information conforms to the state transition format of the specific text information; and if so, acquiring the text information as the text information compliant to the preset state transition rule.

6. The method according to claim 1, characterized in that, the performing multi-dimensional vectorization to a target text according to a preset dimension to obtain a vectorized text comprises:
performing word segmentation to the target text;
selecting a word, a word class and the result of the word segmentation as a dimension, and transforming the target text into a three-dimensional vector.

7. A device for identifying specific text information, characterized in that, the device comprises:
a vectorization unit, configured to perform multi-dimensional vectorization to a target text according to a preset dimension to obtain a vectorized text;
an acquisition unit, configured to acquire text information compliant with a preset state transition rule in the vectorized text, wherein the preset state transition rule is a determination rule established according to specific text information to be identified in the target text, a preset state is determined by a format of the specific text information, and the specific text information is address information or time information; and
a determination unit, configured to calculate the text information obtained by the acquisition unit by using a dynamic programming algorithm, and determining optimal text information compliant with a preset format, and outputting the optimal text information as the result of identifying the specific text information.

8. The device according to claim 7, characterized in that, the determination unit comprises:
a setting module, configured to set a number of dimensions in the dynamic programming algorithm for calculating characters, and a weight value of an individual dimension;
a calculation module, configured to use a Viterbi algorithm to calculate an overall probability value that the format between adjacent characters is compliant with the preset format in different dimensions set by the setting module; and
a determination module, configured to determine the text information with the overall probability value as calculated by the calculation module greater than a preset threshold as the optimal text information.

9. The device according to claim 7, characterized in that, the device further comprises:
a setting unit, configured to set a state transition relationship for characters according to the preset format before the acquiring unit acquires the text information compliant with the preset state transition rule in the vectorized text; and
the setting unit is further configured to set an initial state and an end state of the preset format.

10. The device according to claim 9, characterized in that, the acquisition unit comprises:
a determination module, configured to determine a first character with the initial state according to the arrangement of characters in the vectorized text;
a first judgment module, configured to determine whether the state transition between the first character determined by the determination module and the subsequent adjacent character conforms to the set transition relationship;
a second judgment module, configured to determine whether the character compliant with the transition relationship determined by the first judgment module has the end state, and if so, determining that the character is a last character; and
an acquisition module, configured to acquire the text information between the first character determined by the determination module and the last character determined by the second judgment module as the text information compliant with the preset state transition rule.

* * * * *